United States Patent
Yang et al.

(10) Patent No.: US 10,734,630 B2
(45) Date of Patent: Aug. 4, 2020

(54) SECONDARY BATTERY WITH IMPROVED SAFETY

(71) Applicant: LG Chem, Ltd., Seoul (KR)

(72) Inventors: Han Mo Yang, Daejeon (KR); Duk Hyun Ryu, Daejeon (KR); Jung Jin Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/128,690

(22) Filed: Sep. 12, 2018

(65) Prior Publication Data

US 2019/0081312 A1     Mar. 14, 2019

(30) Foreign Application Priority Data

Sep. 13, 2017  (KR) .................. 10-2017-0117093

(51) Int. Cl.
| | |
|---|---|
| *H01M 2/26* | (2006.01) |
| *H01M 10/613* | (2014.01) |
| *H01M 10/6572* | (2014.01) |
| *H01M 2/02* | (2006.01) |

(52) U.S. Cl.
CPC ........... *H01M 2/26* (2013.01); *H01M 2/0277* (2013.01); *H01M 2/263* (2013.01); *H01M 10/613* (2015.04); *H01M 10/6572* (2015.04); *H01M 2200/00* (2013.01); *H01M 2200/10* (2013.01)

(58) Field of Classification Search
CPC ...................................................... H01M 2/26
See application file for complete search history.

(56) References Cited

U.S. PATENT DOCUMENTS

| | | | |
|---|---|---|---|
| 7,666,547 B2 | 2/2010 | Urano et al. | |
| 2004/0004464 A1* | 1/2004 | Tsukamoto | H01M 10/44 320/162 |
| 2006/0073382 A1* | 4/2006 | Urano | H01M 2/0404 429/161 |
| 2007/0274054 A1* | 11/2007 | Lu | H01M 2/1055 361/727 |
| 2009/0136840 A1* | 5/2009 | Kim | H01M 2/0413 429/163 |
| 2013/0295430 A1* | 11/2013 | Kurahashi | H01M 2/0217 429/120 |

FOREIGN PATENT DOCUMENTS

| | | |
|---|---|---|
| JP | H08329926 A | 12/1996 |
| JP | H10302751 A | 11/1998 |
| JP | 2004-349080 A | 12/2004 |

(Continued)

OTHER PUBLICATIONS

Definitions U.S. Appl. No. 16/128,690 (Year: 2019).*

*Primary Examiner* — Brian R Ohara
(74) *Attorney, Agent, or Firm* — Birch, Stewart, Kolasch & Birch, LLP

(57) ABSTRACT

The present invention relates to a secondary battery. The secondary battery includes an electrode assembly built in a can, a positive electrode tab of the electrode assembly connected to a cap coupled to an upper end of the can, wherein the positive electrode tab having at least one bent portion, a negative electrode tab, and a buffer member inserted into the bent portion of the positive electrode tab. Thus, excessive bending of the positive electrode tab is prevented by the buffer member.

12 Claims, 8 Drawing Sheets

(56) References Cited

FOREIGN PATENT DOCUMENTS

| JP | 2006-100097 | A | 4/2006 |
| KR | 1020060051749 | A | 5/2006 |
| KR | 10-2006-0112729 | A | 11/2006 |
| KR | 10-2009-0053470 | A | 5/2009 |
| KR | 1020130030759 | A | 3/2013 |

* cited by examiner

SECONDARY BATTERY WITH IMPROVED SAFETY

CROSS-REFERENCE TO RELATED APPLICATION

The present application claims the priority of Korean Patent Application No. 10-2017-0117093, filed on Sep. 13, 2017, which is hereby incorporated by reference in its entirety.

TECHNICAL FIELD

The present invention relates to a secondary battery, and more particularly, to a secondary battery in which a disconnection of a positive electrode tab due to external vibration and/or impact is prevented, and if short circuit occurs, the disconnection of the positive electrode tab is induced, and a negative electrode tab is cooled to suppress ignition (and thus explosion), thereby improving safety.

RELATED ART

Secondary batteries, which are widely used in various digital devices and transport means such as vehicles are repeatedly chargeable and dischargeable. Also, research and development are continuously carried out to increase efficiency and improve safety. Secondary batteries may be classified based on a shape of battery case or a material of an electrode assembly, but the secondary batteries are most widely manufactured in a cylindrical type, a prismatic type, and a pouch type.

Among them, in the cylindrical type secondary battery of the related art as shown in FIG. 1, an electrode assembly 30 is built in a cylindrical can 10 which has an opened upper side, and a cap 20 is coupled to an upper end of the can 10. The can 10 is connected to an electrode assembly 30 through a negative electrode tab 60 at a lower end thereof, and the cap 20 is connected to the electrode assembly 30 through a positive electrode tab 40.

The electrode assembly 30 has a structure in which a positive electrode, a separator, and a negative electrode are stacked in an order of positive electrode-separator-negative electrode-separator-positive electrode and repeating the order, and an active material is applied between the positive electrode and the separator and between the negative electrode and the separator.

However, when the secondary battery is charged and discharged, the electrode assembly may undergo repeated expansion and contraction and thus be deformed. In this process, when stress is concentrated into a central portion, the separator may be damaged to cause internal short circuit. In addition, external short circuit may also occur by external factors. When the short circuit occurs, heat may be generated. As a result, when chemical reaction occurs due to the heat generation to generate a gas in a can 10, the possibility of rupture of the can 10 increases.

To solve this safety problem, a safety vent which is ruptured to discharge a gas when an internal gas pressure increases, a PTC device which cuts off current at a high temperature, a current interrupt device (CID) which cuts off current when an internal pressure of the battery increases, and the like are additionally mounted on a cap 20.

As the application fields of the secondary battery expand, the secondary battery is mounted on a device such as an electric skateboard which experiences repeated vibration and impact. However, in the device such as the electric skateboard in which the impact and vibration are continuously applied from the outside, the vibration and impact may be continuously transmitted to the secondary battery. Thus, a positive electrode tab 40 in the secondary battery may be continuously shaken, and the shaking may act as a stress. As a result, as illustrated in FIG. 1 of the related art, disconnection may occur due to accumulation of the stress at a bent part of the positive electrode tab 40. Therefore, it is necessary to solve this problem.

However, when a large amount of current flows due to a short circuit, it will be advantageous in terms of stability that the positive electrode tab 40 and a negative electrode tab 60 is broken first before the secondary battery reaches an ignition temperature or that cooling is performed to lower a temperature to below the ignition temperature.

SUMMARY

Thus, an object of the present invention is to provide a secondary battery which may prevent a disconnection of an electrode tab due to vibration during normal use to overcome the above-describe problems, and when a heat is generated due to a short-circuit, the safety of the secondary battery may be improved through disconnecting the positive electrode tab by the generated heat and/or through cooling a negative electrode tab with a short-circuit current due to the short circuit.

To achieve the abovementioned object, the present invention provides a secondary battery having improved safety. In particular, an electrode assembly may be built in a can, a positive electrode tab of the electrode assembly may be connected to a cap coupled to an upper end of the can, and a negative electrode tab may be connected to the can. Further, the secondary battery may include the positive electrode tab having at least one bent portion, and a buffer member inserted into the bent portion of the positive electrode tab.

According to the present invention, the positive electrode tab may comprise a first bent part that is bent in a width (e.g., lateral) direction of the can and a second bent part that extends from an end of the first bent part and is additionally bent from the first bent part, and the buffer member may be inserted between the first bent part and the second bent part. A fixing member may be formed on one or more parts of the first bent part and the second bent part at a position into which the buffer member is inserted.

The fixing member may comprise a protrusion having a surface that convexly protrudes and a recess part having a recessed surface to receive to the protrusion, wherein one of the protrusion or the recess part may be formed on a surface of the buffer member, and the other of the protrusion or the recess part may be formed on one of the first bent part and the second part. The buffer member may be made of a material having elasticity.

Furthermore, an outer surface of the positive electrode tab may be wrapped with an insulation material, and the insulation material may wrap the entire positive electrode tab. Moreover, the bent portion of the positive electrode tab may be wrapped with the insulation material that has a thickness greater than a thickness of the other portion.

In addition, a Peltier effect device may be attached to the negative electrode tab. When a short-circuit current is generated due to an external short circuit, the short-circuit current may flow through the Peltier effect device, and the negative electrode tab may be cooled as the current flows through the Peltier effect device.

The Peltier effect device may be attached to the negative electrode tab by a protection tape, wherein the protection tape may comprise a double-sided tape for attaching the negative electrode tab to the can and be attached to allow the Peltier effect device to be disposed between the protection tape and the negative electrode tab.

According to the present invention, the buffer member may be mounted on the bent point of the positive electrode tab to prevent excessive bending due to external impact and relieve the stress accumulation due to the continuous vibration, thereby preventing the disconnection of the positive electrode tab due to the physical influence. The buffer member may be fixed by the fixing member and thus prevented from being separated even when the positive electrode tab is shaken by the external impact or vibration.

Furthermore, the outer surface of the positive electrode tab may be wrapped with the insulation material to reduce heat dissipation when heated by the external short circuit, thereby more quickly performing the disconnection. Thus, the temperature rise inside the secondary battery may be interrupted to suppress the occurrence of the explosion and ignition.

In addition, the Peltier effect device may be configured to cool the negative electrode tab (through the short-circuit current generated when the external short circuit occurs) to further suppress the occurrence of the explosion and ignition.

DETAILED DESCRIPTION

Figure 1:
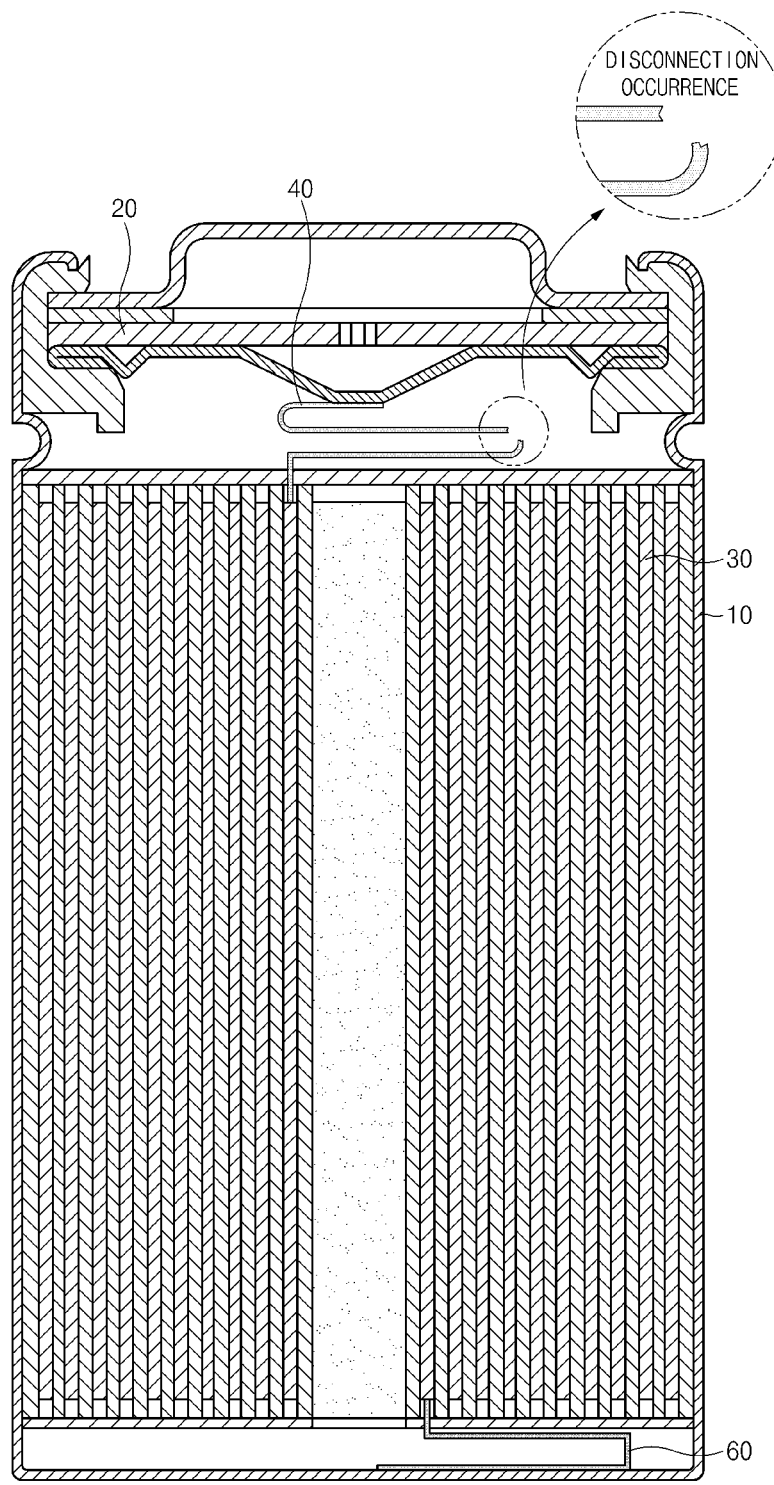
FIG. 1 is a cross-sectional view illustrating a state in which disconnection occurs at a positive electrode tab in the related art.

Hereinafter, exemplary embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the exemplary embodiments set forth herein.

In order to clearly illustrate the present invention, parts that are not related to the description may be omitted, and the same or similar components may be denoted by the same reference numerals throughout the specification.

Also, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

Accordingly, in some embodiments, well-known process steps, well-known structures and well-known techniques will not be specifically described in order to avoid ambiguous interpretation of the present disclosure. The terms used in the present specification are for the purpose of illustrating the examples and do not limit the present disclosure. As used herein, the singular form also includes the plural forms unless specifically stated in a phrase. The terms "comprises" and/or "comprising" used in the specification are used in the meaning of not excluding the presence or addition of one or more other constituent elements, steps, operations and/or elements, in addition to the referenced constituent elements, step, operation and/or element. Further, the term "and/or" includes each and one or more combinations of the referenced items.

The present invention relates to a secondary battery in which an electrode assembly 30 may be built in a can 10, a positive electrode tab 40 may be connected to a cap 20 coupled to an upper end of the can 10, and a negative electrode tab 60 may be connected to the can 10. Hereinafter, exemplary embodiments of the present invention will be described in more detail with reference to the accompanying drawings.

First Embodiment

Figure 2:
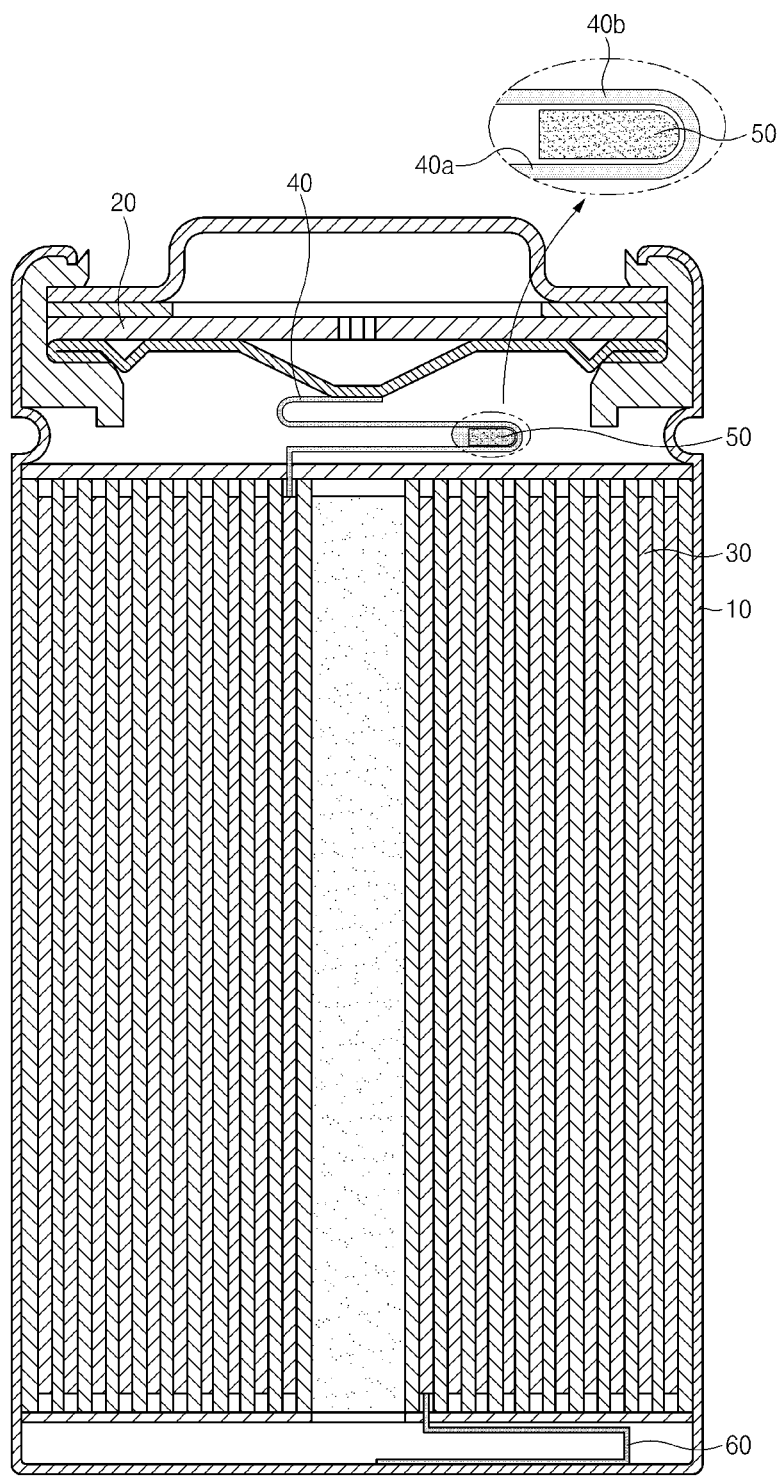
FIG. 2 is a cross-sectional view illustrating a state in which a buffer member is inserted into a bent point of a positive electrode tab according to a first embodiment of the present invention.

As illustrated in FIG. 2, according to an exemplary embodiment of the present invention, a positive electrode tab 40 may include at least one bent point. A buffer member 50 may be inserted into the bent point of the positive electrode tab 40. The buffer member 50 may be inserted into the positive electrode tab 40 to prevent the positive electrode tab 40 from being excessively bent and thus may have an adequate thickness based on a shape and size of the positive electrode tab 40. The buffer member 50 may be made of a material having elasticity to buffer (e.g., attenuate) the vibration or impact when vibration or impact occurs.

As illustrated in FIG. 2, the positive electrode tab 40 may comprise a first bent part 40a that is bent in a width (e.g., lateral) direction of the can 10 and a second bent part 40b that extends from an end of the first bent part 40a and is additionally bent from the first bent part 40a. The buffer member 50 may be inserted between the first bent part 40a and the second bent part 40b.

Figure 3:
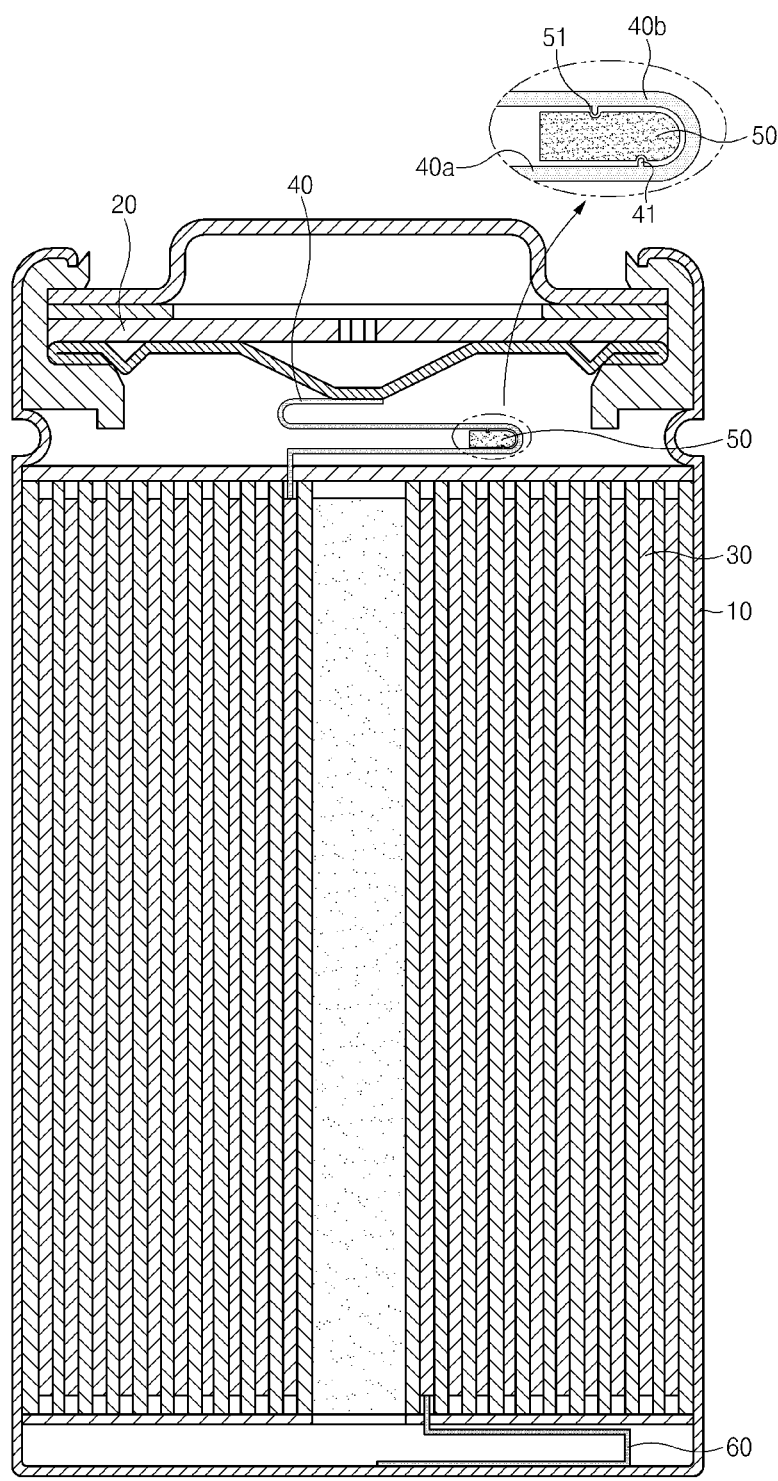
FIG. 3 is a cross-sectional view illustrating a state in which a recess part is formed in a surface of the buffer member, and a protrusion to be inserted into the recess part is formed on a surface of the positive electrode tab to more firmly fix the buffer member.

Referring to FIG. 3, a fixing material may be formed on one or more parts of the first bent part 40a and the second bent part 40b at the position into which the buffer member 50 is inserted. The fixing member according to an exemplary embodiment of the present invention may comprise a protrusion 41 of which a surface convexly protrudes and a recess part 51 having a recessed surface to be closely attached to the protrusion 41.

That is, as illustrated in FIG. 3, the recess part 51 that is concavely recessed may be formed in the surface of the buffer member 50, and the protrusion 41 to be inserted into the recess part 51 may be formed on the first bent part 40*a* and/or the second bent part 40*b*. As another exemplary example, the protrusion may be formed on the surface of the buffer member 50, and the recess part may be formed in the first bent part and/or the second bent part.

Second Embodiment

Figure 4A:
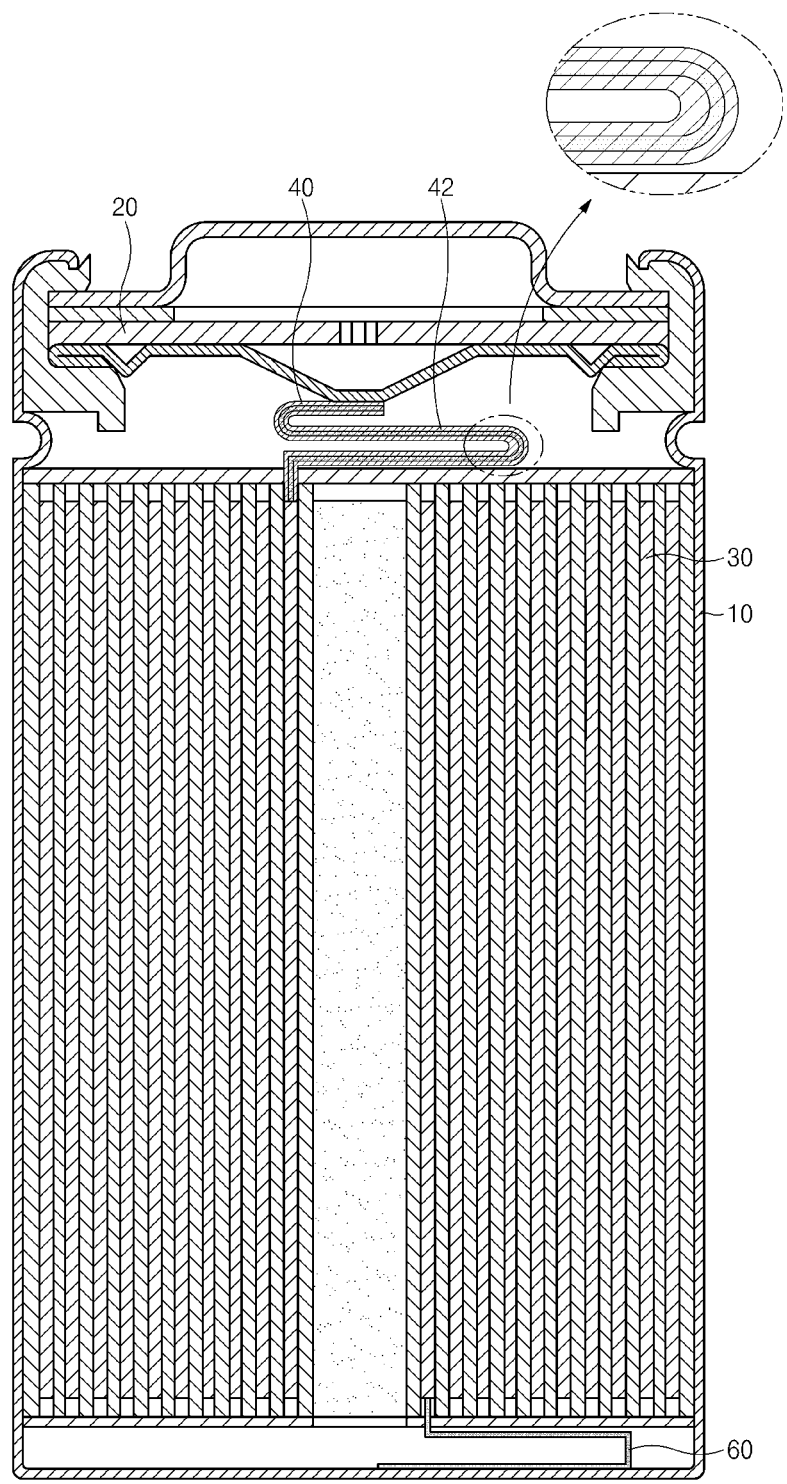
FIG. 4A is a cross-sectional view illustrating a state in which the surface of the positive electrode tap is wrapped with an insulation material according to a second embodiment of the present invention.
Figure 4B:
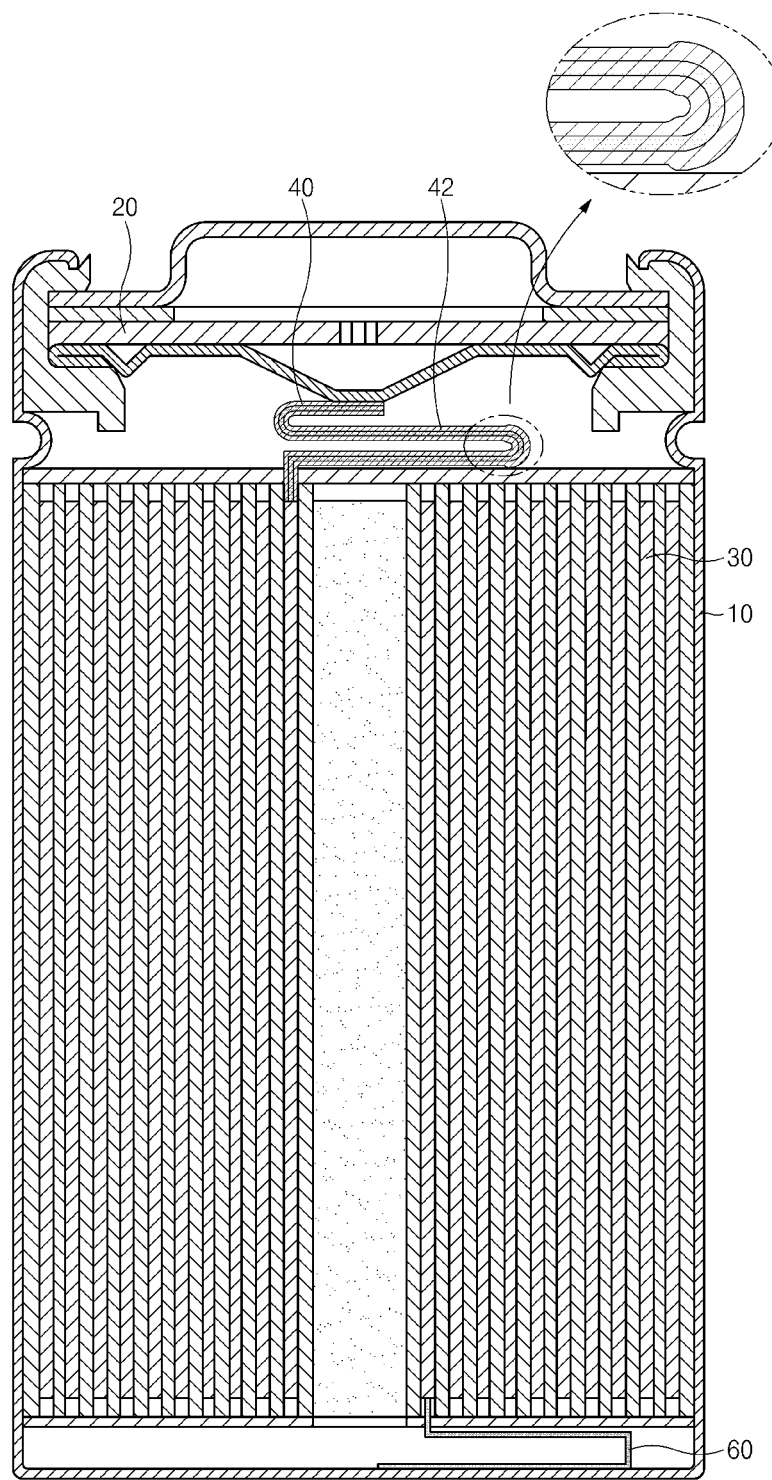
FIG. 4B is a cross-sectional view illustrating a state in which the insulation material additionally wraps the bent point of the positive electrode tab to increase in thickness.
Figure 4C:
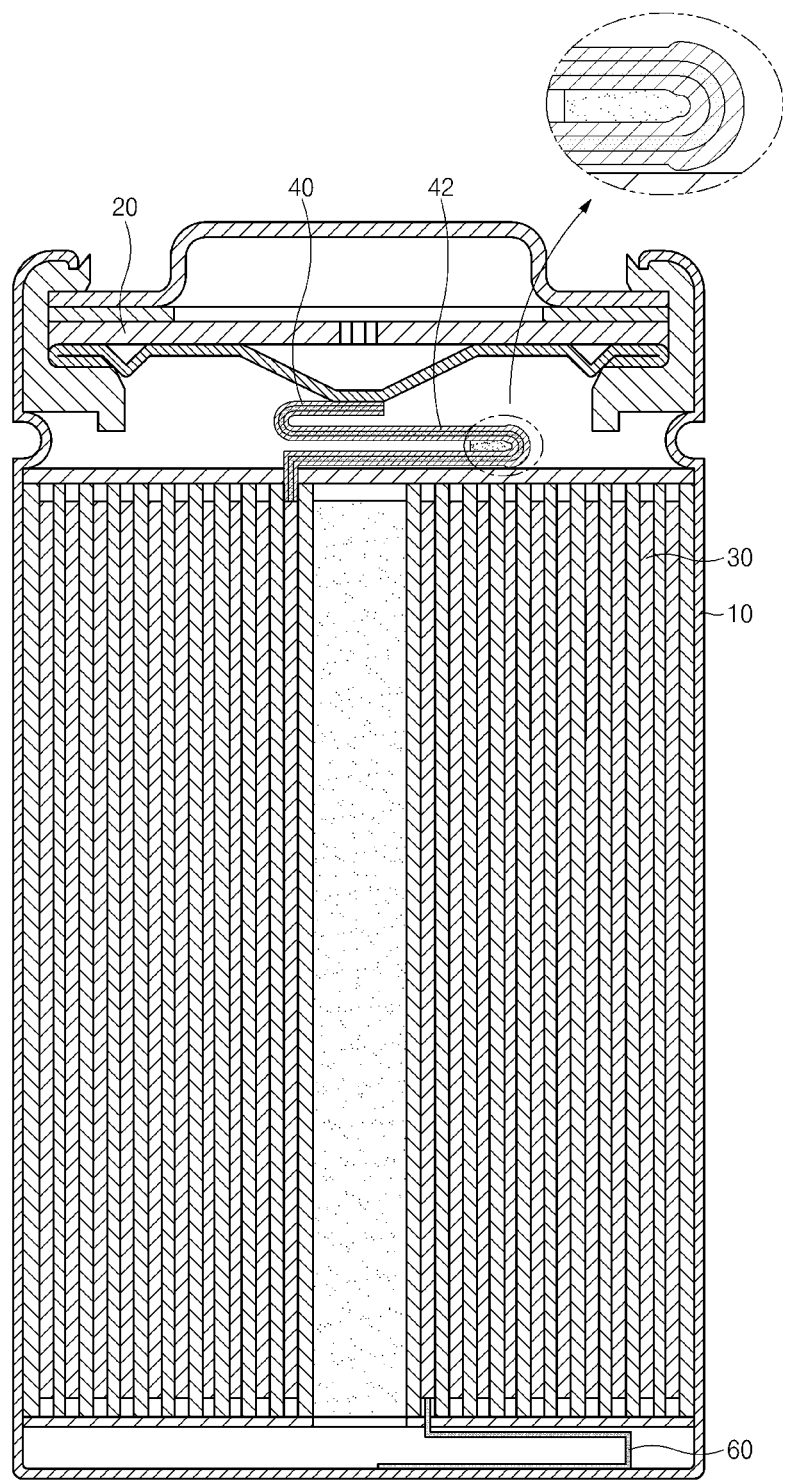
FIG. 4C is a cross-sectional view illustrating a state in which the buffer member is additionally inserted in the state of FIG. 4B.

Furthermore, as illustrated in FIGS. 4A to 4C, an entire outer surface (a portion of the outer surface) of a positive electrode tab 40 may be wrapped with an insulation material 42 (e.g., a thermal insulation material). The insulation material 42 may prevent heat from being released when the heat is generated in the positive electrode tab 40 by external short circuit to induce quick disconnection of the positive electrode tab 40. By preventing the heat dissipation from the positive electrode tab 40, the positive electrode tab 40 may be disconnected more quickly to suppress an occurrence of ignition and/or explosion due to the short circuit before an internal temperature reaches a temperature at which the explosion or ignition may occur.

The positive electrode tab 40 may have the largest resistance at the bent portion, and also, the most heat may be generated at this portion. Thus, to induce the disconnection at this portion, as illustrated in FIG. 4B, the bent portion of the positive electrode tab 40 may be wrapped with the insulation material that has a thickness greater than a thickness of the rest of the insulation material 42.

Figure 5:
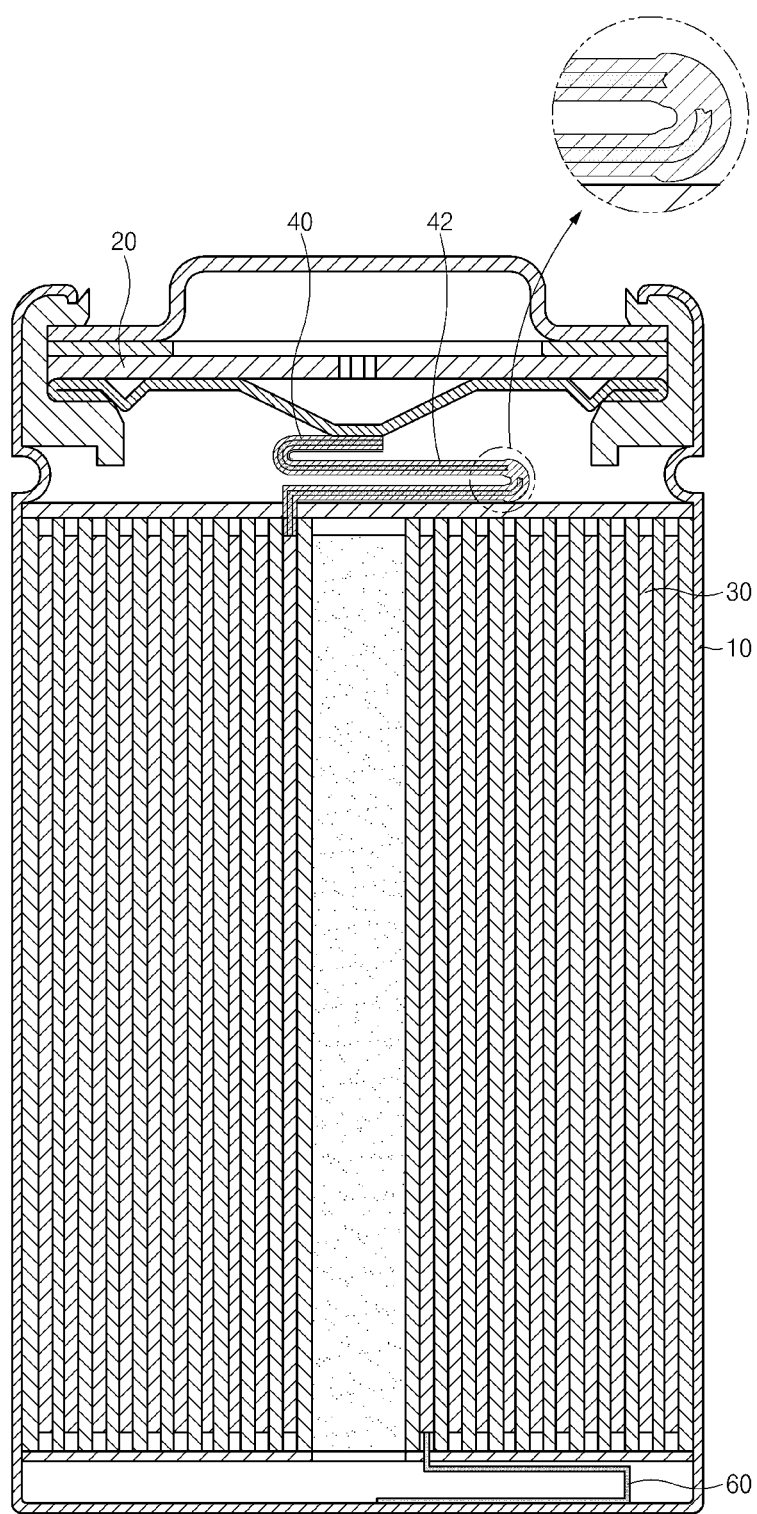
FIG. 5 is a cross-sectional view illustrating a state in which a temperature is concentrated into the bent point of the positive electrode tab to cause disconnection of the positive electrode tab when external short circuit occurs in the state of FIG. 4B.

Moreover, as illustrated in FIG. 4C, the insulation material 42 according to this exemplary embodiment may be installed together with the buffer member 50 of the first exemplary embodiment. As described above, the buffer member 50 may relieve the stress due to the vibration and may effectively add a thickness to the insulation material 42. Thus, as illustrated in FIG. 5, the disconnection of the positive electrode tab 40 may be more easily inducted at the bent portion.

Comparing the first exemplary embodiment with the second exemplary embodiment, the first exemplary embodiment may be configured to prevent the disconnection of the positive electrode tab 40 from occurring during the normal operation of the secondary battery. In the second exemplary embodiment, in the event of an accident in which the internal temperature rises abnormally (e.g., beyond a predetermined temperature), the positive electrode tab 40 may be quickly disconnected to prevent the occurrence of the explosion and the ignition.

Third Embodiment

In the secondary battery, a positive electrode tab 40 as well as a negative electrode tab 60 may be vulnerable to ignition. Since the negative electrode tab 60 has a small bending curvature compared with the bending curvature of the positive electrode tab 40, the present invention may provide a structure in which cooling is performed to prevent ignition of the negative electrode tab 60.

Figure 6:
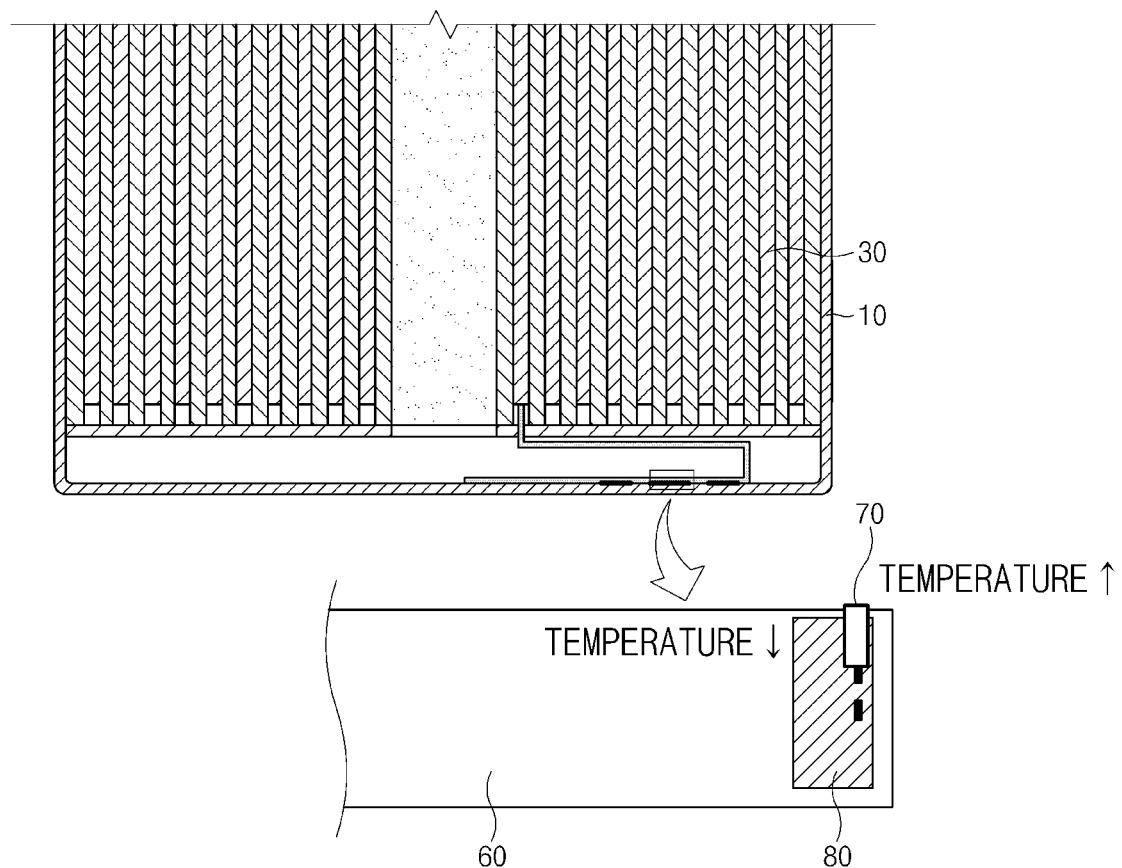
FIG. 6 is a cross-sectional view and an enlarged view illustrating a state in which a Peltier effect device is attached to a negative electrode tab according to a third embodiment of the present invention.

As illustrated in FIG. 6, according to the third exemplary embodiment, a Peltier effect device 70 may be attached to the negative electrode tab 60. The Peltier effect device 70 may be a cooling device that uses a Peltier effect. The Peltier effect is a phenomenon in which, when two kinds of conductors are coupled to each other and conduct a current, one of contacts generates heat, and the other contact absorbs heat. A surface of the Peltier effect device 70, which corresponds to a cooling side, may be attached to the negative electrode tab 60. When a short-circuit current is generated by external short circuit, the short-circuit current may flow through the Peltier effect device 70, and consequently, the negative electrode tab may be cooled as the current flows through the Peltier effect device 70.

As illustrated in FIG. 6, the Peltier effect device 70 may be attached to the negative electrode tab 60 through a protection tape 80. In particular, the protection tape 80 may be a double-sided tape for attaching the negative electrode tab 60 to a can 10. Also, the Peltier effect device 70 may be disposed between the protection tape 80 and the negative electrode tab 60. The negative electrode tab 60, the protection tape 80, the Peltier effect device 70, and a bottom of the can 10 may be sequentially disposed from top to bottom with respect to a cross-sectional view of the position at which the Peltier effect device 70 is disposed.

The present invention comprising the above-described constituents may provide the secondary battery in which the positive electrode tab 40 may be prevented from being disconnected by the external impact and/or vibration during the normal use. However, when the short circuit occurs, the disconnection of the positive electrode tab 40 may be quickly induced, and the negative electrode tab 60 may be cooled, and thereby improving the safety.

In particular, according to the present invention, the buffer member 50 may be mounted on the bent point of the positive electrode tab 40 to prevent the positive electrode tab 40 from being excessively bent by the external impact and to relieve the stress accumulation due to the continuous vibration, thereby preventing the disconnection of the positive electrode tab 40 due to the physical influence. The buffer member 50 may be fixed by the fixing member and thus prevented from being separated even when the positive electrode tab 40 is shaken by the external impact or vibration.

In another aspect, the outer surface of the positive electrode tab 40 may be wrapped with the insulation material 42 to prevent heat dissipation when the positive electrode tab 40 is heated by the external short circuit, thereby more quickly performing the disconnection. Thus, the temperature rise inside the secondary battery may be interrupted before explosion and ignition.

As described above, the Peltier effect device 70 may be attached to the negative electrode tab 60, and thus, when the external short circuit occurs, the Peltier effect device 70 may be configured to cool the negative electrode tab 60 through the short-circuit current due to the external short circuit, thereby additionally suppressing the explosion and ignition.

While the exemplary embodiments of the present invention have been described with reference to the specific embodiments, it will be apparent to those skilled in the art that various changes and modifications may be made without departing from the spirit and scope of the invention as defined in the following claims.

DESCRIPTION OF THE SYMBOLS

10: Can
20: Cap
30: Electrode assembly
40: Positive electrode tab
50: Buffer member
60: Negative electrode tab 70 Peltier effect device
80: Protection tape

The invention claimed is:

1. A secondary battery, comprising:
an electrode assembly disposed within a can,
a positive electrode tab of the electrode assembly connected to a cap coupled to an upper end of the can, wherein the positive electrode tab includes at least one bent portion;
a negative electrode tab connected to the can; and
a buffer member inserted into the bent portion of the positive electrode tab, wherein the buffer member is made of an elastic material to attenuate vibration or impact applied to the positive electrode tab,
wherein the positive electrode tab comprises a first bent part that is bent in a lateral direction of the can and a second bent part that extends from an end of the first bent part and is additionally bent from the first bent part,
wherein the buffer member is inserted between the first bent part and the second bent part while abutting the end of the first bent part, and
wherein the buffer member is fully inserted as a single piece into a space adjoining the first bent part and the second bent part.

2. The secondary battery of claim 1, wherein one or more fixing member is formed on the first bent part and the second bent part at a position into which the buffer member is inserted.

3. The secondary battery of claim 2, wherein the fixing member comprises a protrusion having a surface that convexly protrudes and a recess part having a recessed surface to receive the protrusion,
wherein one of the protrusion or the recess part is formed on a surface of the buffer member, and the other of the protrusion or the recess part is formed on one of the first bent part and the second part.

4. The secondary battery of claim 1, wherein an outer surface of the positive electrode tab is wrapped with an insulation material.

5. The secondary battery of claim 4, wherein the insulation material wraps the entire positive electrode tab.

6. The secondary battery of claim 4, wherein a portion of the insulation material at the bent portion of the positive electrode tab has a thickness greater than a thickness of rest of the insulation material.

7. The secondary battery of claim 1, wherein a Peltier effect device is attached to the negative electrode tab,
when a short-circuit current is generated due to an external short circuit, the short-circuit current flows through the Peltier effect device; and
the negative electrode tab is cooled as the current flows through the Peltier effect device.

8. The secondary battery of claim 7, wherein the Peltier effect device is attached to the negative electrode tab by a protection tape.

9. The secondary battery of claim 8, wherein the protection tape comprises a double-sided tape for attaching the negative electrode tab to the can and is attached to allow the Peltier effect device to be disposed between the protection tape and the negative electrode tab.

10. A secondary battery having improved safety, comprising:
an electrode assembly disposed within a can,
a positive electrode tab of the electrode assembly connected to a cap coupled to an upper end of the can, wherein the positive electrode tab includes at least one bent portion;
a negative electrode tab connected to the can;
a buffer member inserted into the bent portion of the positive electrode tab; and
a Peltier effect device attached to the negative electrode tab by a protection tape.

11. The secondary battery of claim 10, wherein, when a short-circuit current is generated due to an external short circuit, the short-circuit current flows through the Peltier effect device, and the negative electrode tab is cooled as the current flows through the Peltier effect device.

12. The secondary battery of claim 10, wherein the protection tape comprises a double-sided tape for attaching the negative electrode tab to the can and is attached to allow the Peltier effect device to be disposed between the protection tape and the negative electrode tab.

* * * * *